(12) United States Patent
Chen

(10) Patent No.: US 11,322,955 B2
(45) Date of Patent: May 3, 2022

(54) STORAGE DEVICE

(71) Applicant: Shenzhen Yuchangtai Electronic Co., Ltd, Shenzhen (CN)

(72) Inventor: Wenyu Chen, Shenzhen (CN)

(73) Assignee: Shenzhen Yuchangtai Electronic Co., Ltd, Shenzhen (CN)

( * ) Notice: Subject to any disclaimer, the term of this patent is extended or adjusted under 35 U.S.C. 154(b) by 325 days.

(21) Appl. No.: 16/389,430

(22) Filed: Apr. 19, 2019

(65) Prior Publication Data

US 2020/0274377 A1   Aug. 27, 2020

(30) Foreign Application Priority Data

Feb. 27, 2019   (CN) .......................... 201920251112.2

(51) Int. Cl.
| | |
|---|---|
| *H02J 7/00* | (2006.01) |
| *A45C 11/00* | (2006.01) |
| *A45C 13/00* | (2006.01) |
| *H02J 7/02* | (2016.01) |

(52) U.S. Cl.
CPC ............ *H02J 7/0044* (2013.01); *A45C 11/00* (2013.01); *A45C 13/001* (2013.01); *H02J 7/0027* (2013.01); *H02J 7/025* (2013.01); *A45C 2011/002* (2013.01)

(58) Field of Classification Search
USPC .......................... 320/106, 107, 108, 110, 114
See application file for complete search history.

(56) References Cited

U.S. PATENT DOCUMENTS

| | | | |
|---|---|---|---|
| 2012/0013294 A1* | 1/2012 | Yeh ........................ | H02J 7/0044 320/108 |
| 2013/0175993 A1* | 7/2013 | Chen ..................... | H02J 7/0044 320/114 |
| 2016/0276852 A1* | 9/2016 | Roberts .................. | A45C 13/02 |
| 2017/0027079 A1* | 1/2017 | Dombrowski ............ | H02J 5/00 |
| 2018/0295986 A1* | 10/2018 | Dash ....................... | A47B 83/04 |

FOREIGN PATENT DOCUMENTS

| | | | |
|---|---|---|---|
| CN | 208226679 U | * | 12/2018 |
| KR | 200484292 Y1 | * | 8/2017 |

* cited by examiner

*Primary Examiner* — Brian Ngo
(74) *Attorney, Agent, or Firm* — von Briesen & Roper, s.c.

(57) ABSTRACT

The disclosure relates to a storage device including: at least one mobile storage box; at least one mobile charger; and at least one connector provided on an outer surface of the mobile charger or the mobile storage box, and the connector is configured to implement a detachable connection between two mobile storage boxes, between two mobile chargers, or between the mobile storage box and the mobile charger.

6 Claims, 7 Drawing Sheets

STORAGE DEVICE

CROSS-REFERENCE TO RELATED APPLICATIONS

This application claims priority to Chinese Patent Application No. 201920251112.2, entitled "DETACHABLE WIRELESS CHARGING AND RECEIVING BOX" filed on Feb. 27, 2019, the contents of which are expressly incorporated by reference herein in their entirety.

TECHNICAL FIELD

The present disclosure relates to the technical field of storage tools, in particular to a storage device.

BACKGROUND

The storage box is a very common storage tool used in daily life. It can hold various articles for daily use, especially some small objects, such as a remote controller, a pen barrel, a key, a scissor, a stapler, etc. At present, there are shortcomings in the common storage boxes: first, most of the storage boxes are fixedly installed in a certain position, such as the desk top, the home table top, or the kitchen, which cannot be moved at will; second, most of the storage boxes are fixed in shape, and cannot be freely combined and separated according to the user's requirements, and the flexibility is low; third, most of the storage boxes only provide a singular storage function, it is difficult to meet the needs of modern society for product function diversification.

SUMMARY

According to an embodiment, a storage device with function diversification is provided.

A storage device includes at least one mobile storage box; at least one mobile charger; and at least one connector provided on an outer surface of the mobile charger or the mobile storage box, and the connector is configured to implement a detachable connection between two mobile storage boxes, between two mobile chargers, or between the mobile storage box and the mobile charger.

The disclosure also provides another storage device, including at least one mobile storage box; a connector arranged on an outer surface of the mobile storage box and configured to implement a detachable connection between two mobile storage boxes; and a mobile charger being of a flat structure and having a horizontally arranged bearing surface configured to receive the mobile storage box; and the connector is at least one selected from the group consisting of a magnetic member, a latching member, or a hook&loop.

Details of one or more embodiments of the disclosure will be introduced in the drawings and descriptions as follows. And other characteristics, purposes and advantages of the present disclosure will be apparent from the specification, drawings and appended claims.

DETAILED DESCRIPTION OF THE EMBODIMENTS

Figure 1:
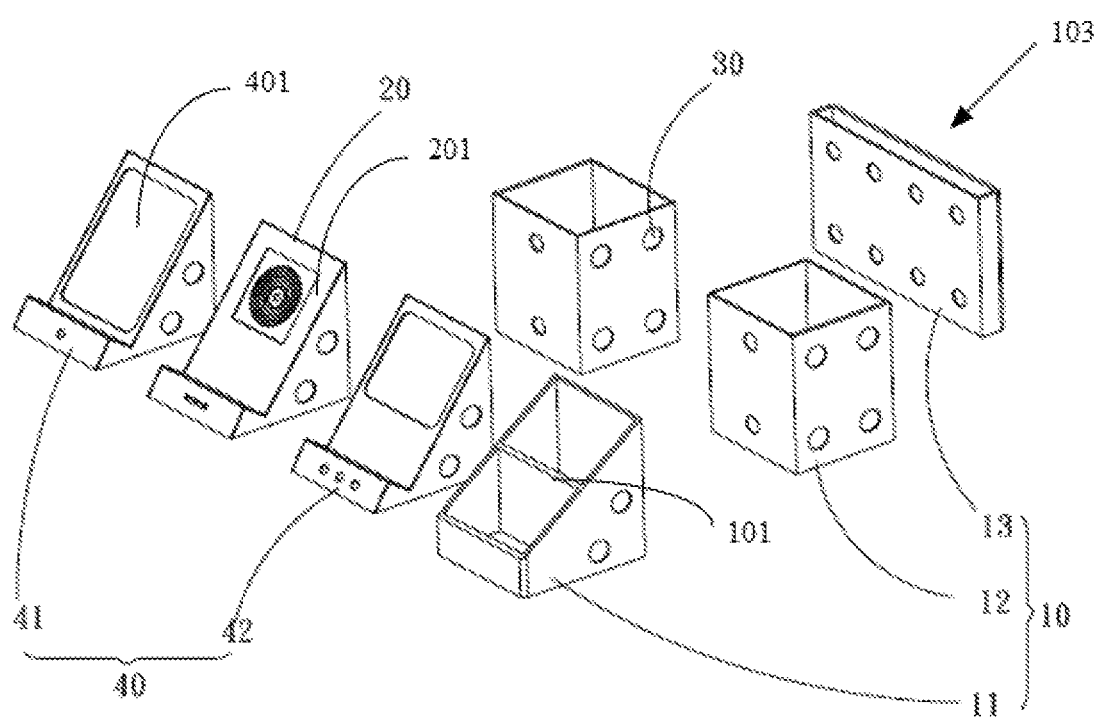
FIG. 1 is an exploded, perspective view of a storage device according to a first embodiment.

Embodiments of the disclosure are described more fully hereinafter with reference to the accompanying drawings. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

It will be understood that when an element is referred to as being "fixed" to another element, it can be directly connected or coupled to the other element or intervening elements may be present. And if an element is referred to as being "connected" to another element, it can be directly connected or coupled to the other element or intervening elements may be present.

Unless otherwise defined, all terms (including technical and scientific terms) used herein have the same meaning as commonly understood by one of ordinary skill in the art to which this disclosure belongs. Terms used in the specification of the disclosure are intended to describe specific embodiments rather than restricting the disclosure.

As shown in FIGS. 1 to 4, a storage device 100 according to an embodiment is provided. The storage device 100 includes at least one mobile storage box 10 and at least one mobile charger 20. Each mobile storage box 10 and each mobile charger 20 are provided with a connector 30. The connectors 30 are arranged on the outer surfaces of the mobile storage box 10 and the mobile charger 20. The connector 30 is configured to implement a detachable connection between two mobile storage boxes 10, or between two mobile chargers 20, or between the mobile storage box 10 and the mobile charger 20.

The mobile storage box 10 and the mobile charger 20 may be embodied in various ways.

For example, in an embodiment, the mobile storage boxes 10 of three shapes are provided. Specifically, referring to FIG. 1, a trapezoidal first storage box 11, two cuboid second storage boxes 12, and a flat third storage box 13 are provided. The connectors 30 are provided on left and right sides and the back surface of the first storage box 11, and the connectors 30 are provided on the lateral sides of the second storage boxes 12 or the third storage box 13.

In an embodiment, the mobile charger 20, as an example, is a wireless charger. In other embodiments, the mobile charger 20 may also be a power bank or a combination of the power bank and the wireless charger according to the needs of the user.

In addition, in the embodiment, the mobile charger 20 is provided with a triangular structure, which has an inclined support surface 201 which is used to support an object leaning thereon, for example, to support a mobile terminal. It will be appreciated that in other embodiments, the mobile storage box 10 may also have an inclined support surface 101.

Based on the feature of free combining and separating, the storage device 100 can also implement function expansion by providing at least one additional-function members 40. The additional-function member 40 is further provided with a connector 30 arranged on an outer surface of the additional-function member 40. The connector 30 is also configured to implement a detachable connection between two additional-function members 40, between the additional-function element 40 and the mobile storage box 10, or between the additional-function member 40 and the mobile charger 20. The additional-function member 40, as an extended function member, can be freely separated and combined the same as the mobile storage box 10 and the mobile charger 20, and can thus greatly extend the functions of the storage device 100.

Further, the additional-function member 40 may be at least one selected from the group consisting of a mobile handwriting pad 41, a mobile timer 42, a mobile display, a mobile keyboard, a mobile calculator, a mobile speaker, or other movable functional devices.

For example, as shown in FIG. 1, in an embodiment, the storage device 100 further includes a mobile handwriting pad 41 and a mobile timer 42, the overall shapes of which are similar to the mobile charger 20 so as to facilitate molding in production and alignment in combined used.

Further, as similar to the shape of the mobile charger 20 described above, the additional-function member 40 may also have an inclined support surface 401. The inclined support surface 401 may be configured to support the mobile terminal leaning thereon, such as the mobile handwriting pad 41 and the mobile timer 42 in FIG. 1.

The connector 30 may have various configurations, for example, the connector 30 is at least one selected from the group consisting of a magnetic member, a latching member, or a hook&loop.

For example, in the embodiment, as shown in FIG. 1, the connector 30 is a magnetic member. Specifically, the connector 30 is a circular magnet embedded on the outer surfaces of the mobile charger 20 and the mobile storage box 10. The mobile chargers 20, the mobile storage boxes 10, and the additional-function members 40 are collectively referred to as functional members. The combination and securing between two functional members is implemented by means of magnetic attraction, and at the same time, the separation can be carried out flexibly. Further, the magnetic attraction may be performed by magnets attracted to each other by different polarities, or by an iron member provided on a functional member and attracted by the magnet. In addition, in other embodiment, the magnet may also be of square, triangular, or other shapes.

In addition, in other embodiments, the iron elements and magnets may be arranged around the functional members, so that the combination between two functional members can be implemented more flexibly.

It should be understood that in other embodiments, the detachable connection may also be provided by means of a latching member. For example, a pair of matching protrusion and groove are provided, and the detachable connection is provided by the matching of the protrusion and the groove (similar to the combining of Lego blocks). In other embodiment, it may also be implemented using a hook&loop.

It should be noted that, in other embodiments, the mobile storage box 10 may also have a flat structure. The connector 30 is arranged on one side of the movable storage box 10, and the side of the mobile storage box 10 opposite to the connector 30 is provided with a horizontally arranged bearing surface 103. The mobile charger 20 can be placed directly on the bearing surface 103 by placing the mobile storage box 10 horizontally and with the bearing surface 103 arranged upside.

Similarly, in other embodiments, the mobile charger 20 has a flat structure. The connector 30 is arranged on one side of the mobile charger 20, and a side of the mobile charger 20 opposite to the connector 30 has a horizontally arranged bearing surface 202, the mobile charger 20 is located on the bearing surface 202. The mobile storage box 10 can be placed directly on the bearing surface 202 by placing the mobile charger 20 horizontally and with the bearing surface 202 facing upward.

Figure 2:
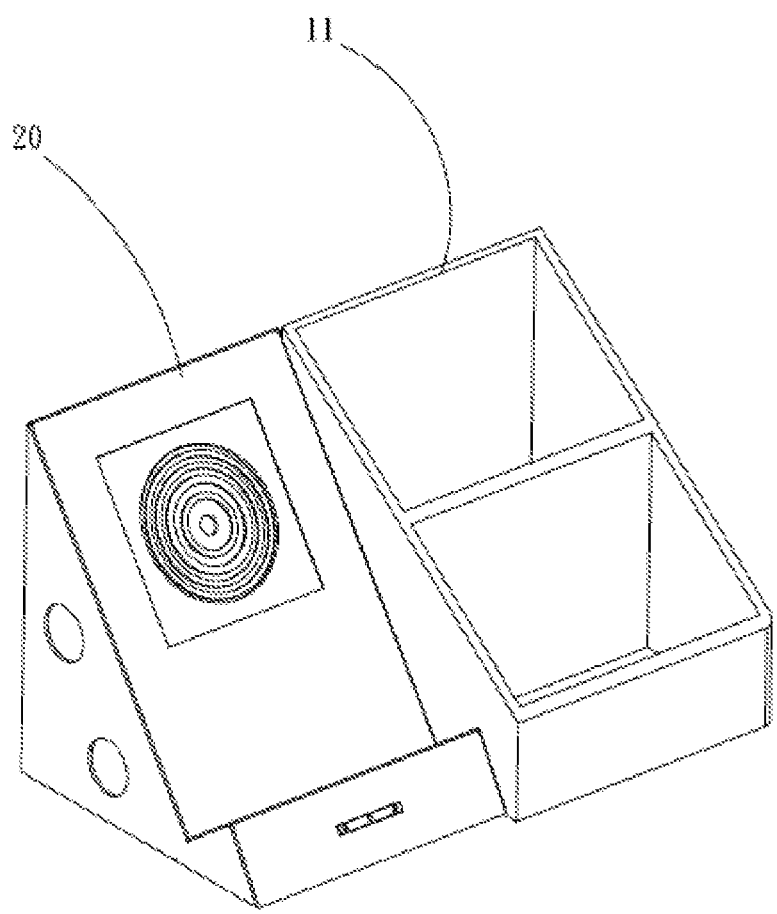
FIG. 2 is a perspective view of a combination of the storage device of FIG. 1.
Figure 3:
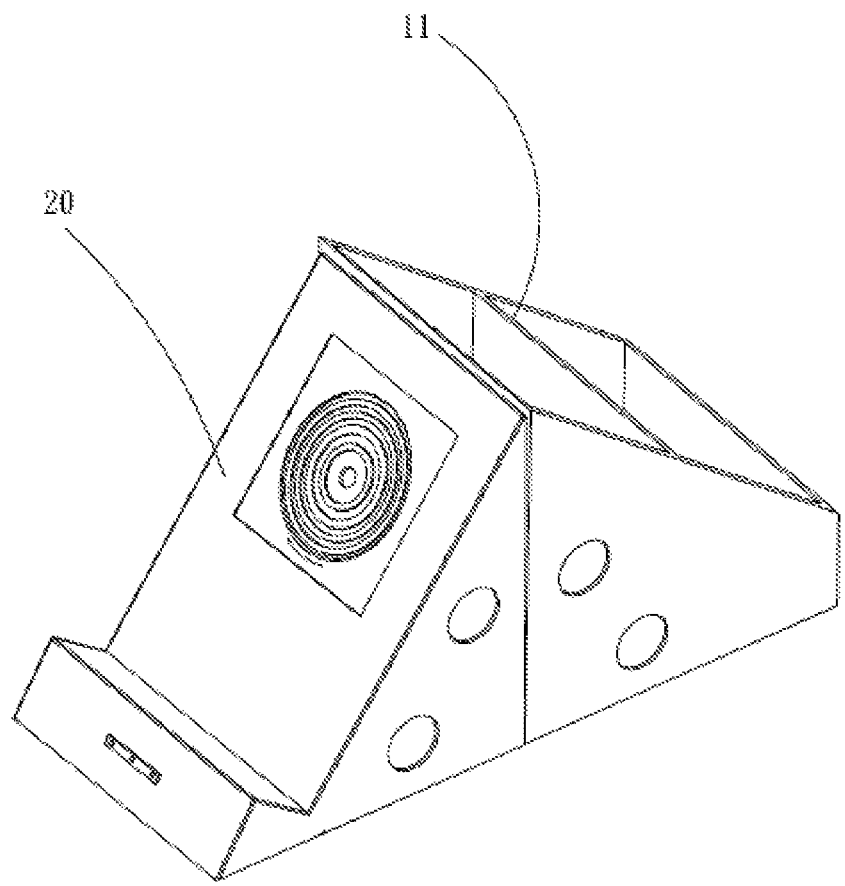
FIG. 3 is a perspective view of another combination of the storage device shown in FIG. 2.
Figure 4:
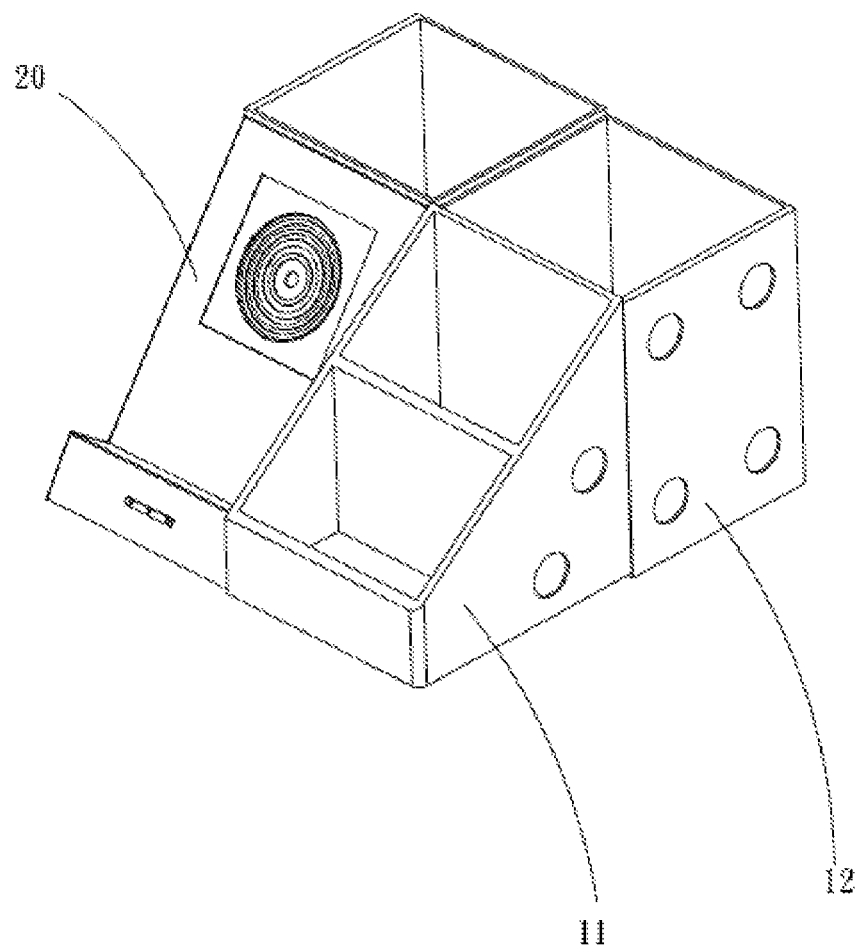
FIG. 4 is a perspective view of yet another combination of the storage device shown in FIG. 1.

During use, any number of mobile chargers 20 and any number of mobile storage boxes 10 may be used in combination, or any one or more of the functional members may be taken out and moved to a desired location for temporary use. For example, as shown in FIG. 2, the mobile charger 20 and the first storage box 11 may be selected, and the outer sides thereof are connected together by the connector 30. As another example, as shown in FIG. 3, the mobile charger 20 and the first storage box 11 may be combined back-on-back. For yet another example, the mobile charger 20, the first storage box 11, and the two second storage boxes 12 may be combined together.

The storage device 100 is provided with a mobile storage box 10 for storing articles and a mobile charger 20 for charging an electronic product. Each mobile storage box 10 and each mobile charger 20 is a movable and individually usable functional member. In the meantime, each mobile storage box 10 and each mobile charger 20 are provided with a connector 30, by which a detachable connection between two mobile storage boxes 10, between two mobile chargers 20, or between the mobile storage box 10 and the mobile charger 20 can be provided and thus a free combination of any of the functional members can be implemented. By this design, the storage device 100 can not only be moved freely by the user, each functional member of the storage device 100 can also be freely combined according to the needs of the user, thus the diversity of the combinations is achieved, and the flexibility of use is improved. In addition, not only the storage function, but also the charging function can be realized, therefore the purpose of the function diversification can be achieved.

Figure 5:
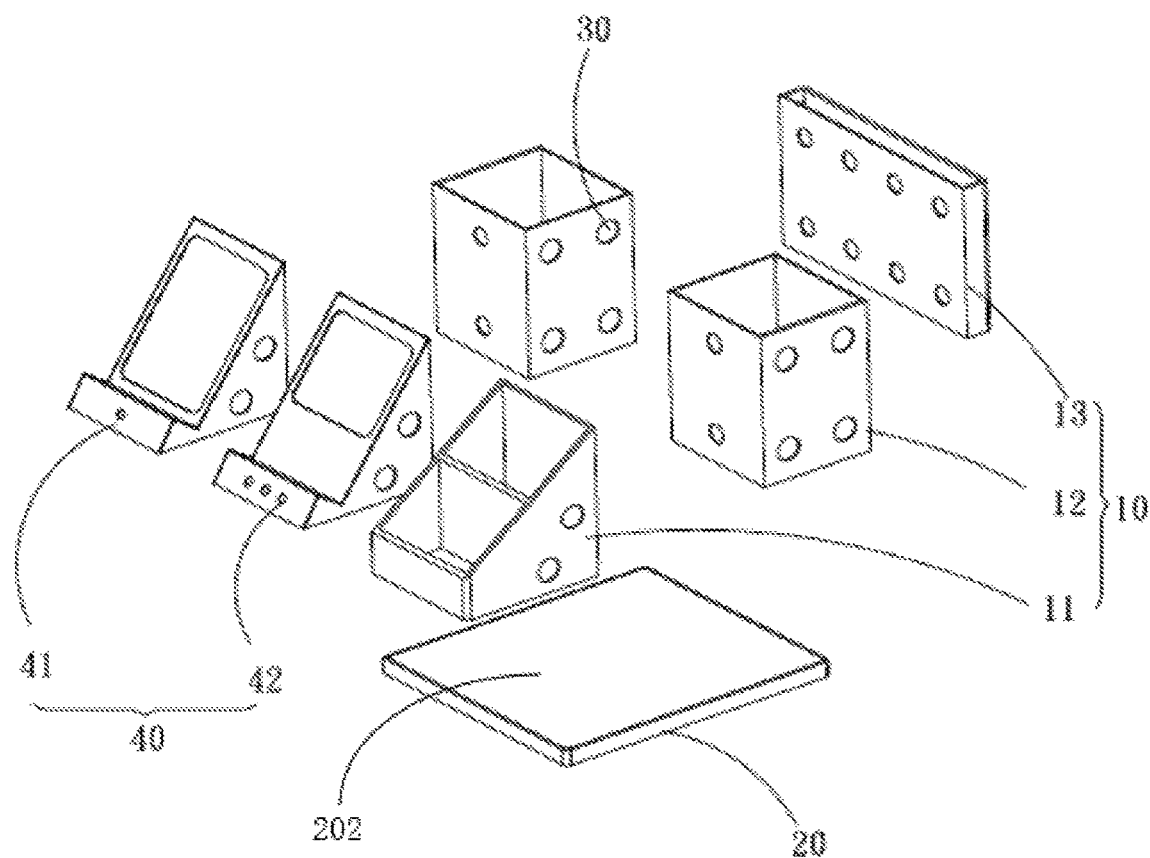
FIG. 5 is a perspective view of a storage device according to a second embodiment.
Figure 6:
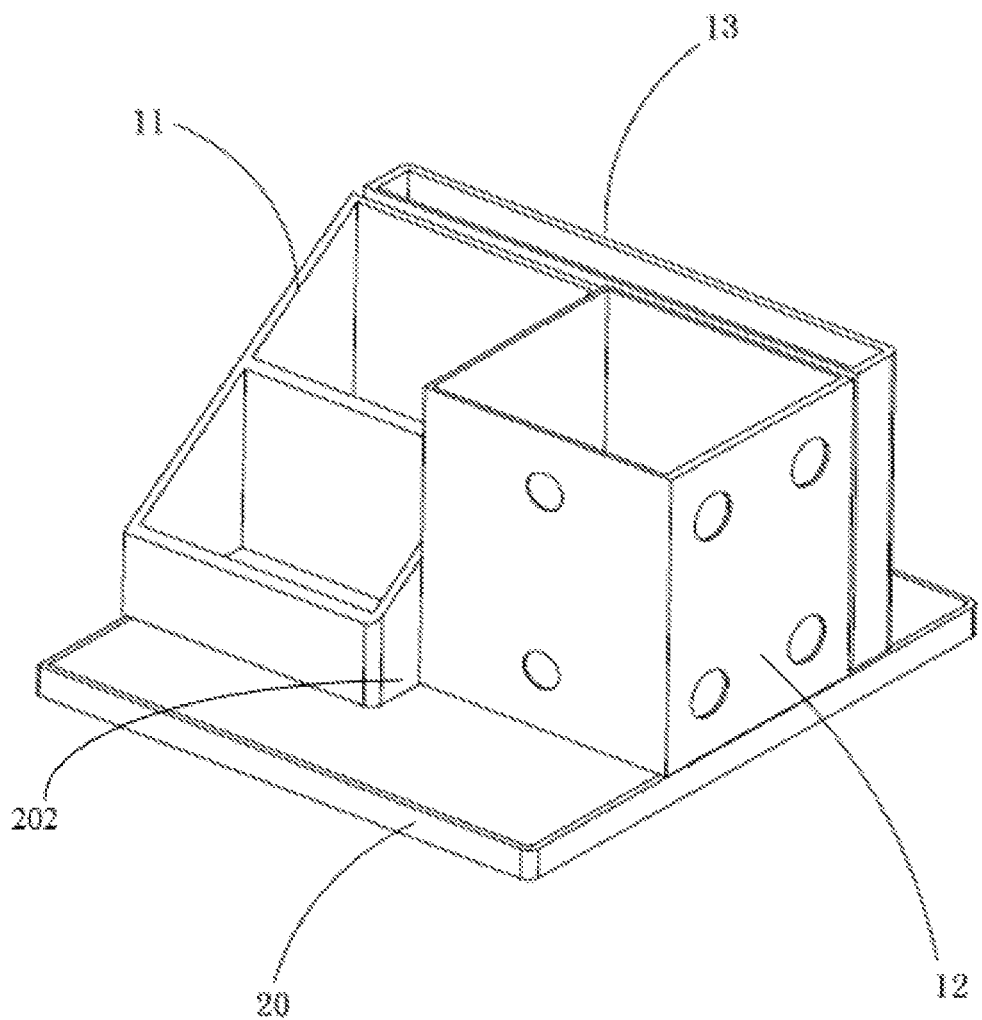
FIG. 6 is a perspective view of an combination of the storage device shown in FIG. 5.

As shown in FIG. 5 and FIG. 6, a storage device 200 according to a second embodiment is provided.

The second embodiment is different from the first embodiment in that, in the storage device 200, the mobile charger 20 has a flat structure and is provided with a horizontally disposed bearing surface 202. By means of the bearing surface 202, the mobile storage box 10 can be placed directly on the bearing surface 202.

As shown in FIG. 5, the storage device 200 includes at least one mobile storage box 10 and at least one mobile charger 20. Each mobile storage box 10 is provided with a connector 30. The connector 30 is arranged on the outer surface of the mobile storage box 10. The mobile charger 20 is has a flat structure and is provided with a horizontally arranged bearing surface 202. The bearing surface 202 is configured for placing the mobile storage box 10. The connector 30 is configured to implement a detachable connection between two movable storage boxes 10.

Similar to the first embodiment, in the second embodiment, the connector 30 is at least one selected from the group consisting of a magnetic member, a latching member, or a hook&loop.

For example, as shown in FIG. 6, the first storage box 11, the second storage box 12, and the third storage box 13 described above may be combined together and then placed on the bearing surface 202 of the mobile charger 20. The mobile charger 20 may be a power bank, a wireless charger, or a combination thereof.

Other structures in this embodiment are the same as or similar to those in the first embodiment and are omitted for brevity.

Figure 7:
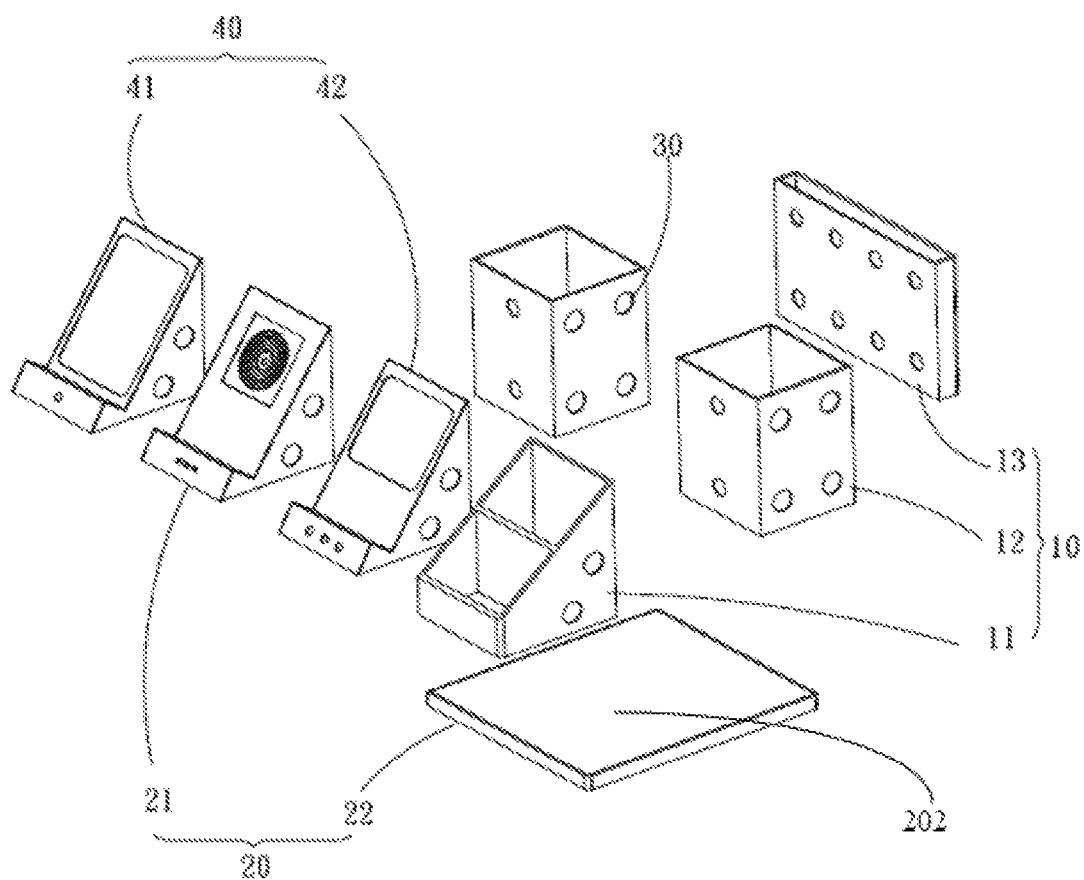
FIG. 7 is a perspective view of a storage device according to a third embodiment.

As shown in FIG. 7, a storage device 300 according to a third embodiment can also be provided.

The third embodiment is different from the first embodiment and the second embodiment in that, the storage device 300 of the third embodiment is provided with the mobile chargers 20 in accordance with both the first embodiment and the second embodiment. As shown in FIG. 7, the number of mobile chargers 20 is at least two, and the outer surface of at least one mobile charger 20 is connected with a connector 30. In addition, at least one mobile charger 20 is has a flat structure and is provided with a horizontally arranged bearing surface 202 through which the mobile storage box 10 can be directly placed on the bearing surface 202 (for the purpose of differentiating, correspondingly the first charger 21 and the second charger 22 in FIG. 7). In the embodiment, there are more free combinations than in the first embodiment and the second embodiment.

Other structures of this embodiment can be referred to the descriptions in the first embodiment and the second embodiment and are omitted for brevity.

The foregoing respective technical features involved in the respective embodiments can be combined arbitrarily, for brevity, not all possible combinations of the respective technical features in the foregoing embodiments are described, however, to the extent they have no collision with each other, the combination of the respective technical features shall be considered to be within the scope of the description.

The foregoing implementations are merely specific the embodiment of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A storage device, comprising:
   at least one mobile storage box;
   at least one wireless charger; and
   a plurality of connectors provided on outer surfaces of the wireless charger and the mobile storage box, and
   at least one additional-function member, wherein the connector is provided on an outer surface of the additional-function member, and the connector is further configured to implement a detachable connection between two additional-function members, between the additional-function member and the mobile storage box, or between the additional-function member and the wireless mobile charger;
   wherein the connector is configured to implement a detachable connection between the mobile storage box and the wireless charger;
   wherein the wireless charger has an inclined support surface configured to support a mobile terminal.

2. The storage device according to claim 1, wherein the mobile storage box has a flat structure, the connector is arranged on one side of the mobile storage box, and a side of the mobile storage box opposite to the connector has a horizontally arranged bearing surface, the wireless charger is located on the bearing surface.

3. The storage device according to claim 1, wherein the wireless charger has a flat structure, the connector is arranged on one side of the wireless charger, and a side of the wireless charger opposite to the connector has a horizontally arranged hearing surface, the mobile storage box is located on the bearing surface.

4. The storage device according to claim 1, wherein the additional-function member has an inclined support surface configured to support a mobile terminal.

5. The storage device according to claim 1, wherein the additional-function member is at least one selected from the group consisting of a mobile handwriting pad, a mobile timer, a mobile display, a mobile keyboard, a mobile calculator, and a mobile speaker.

6. The storage device according to claim 1, wherein the connector is at least one selected from the group consisting of a magnetic member, a latching member, and a hook&loop.

* * * * *